R. J. BERRYMAN.
PROCESS OF MANUFACTURING AND HARVESTING ICE.
APPLICATION FILED DEC. 31, 1907.
936,978.
Patented Oct. 12, 1909.
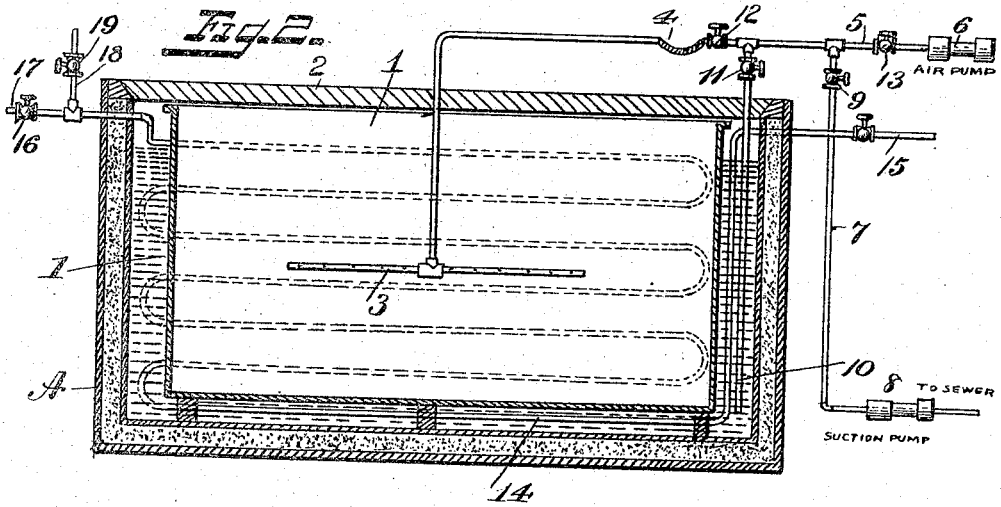
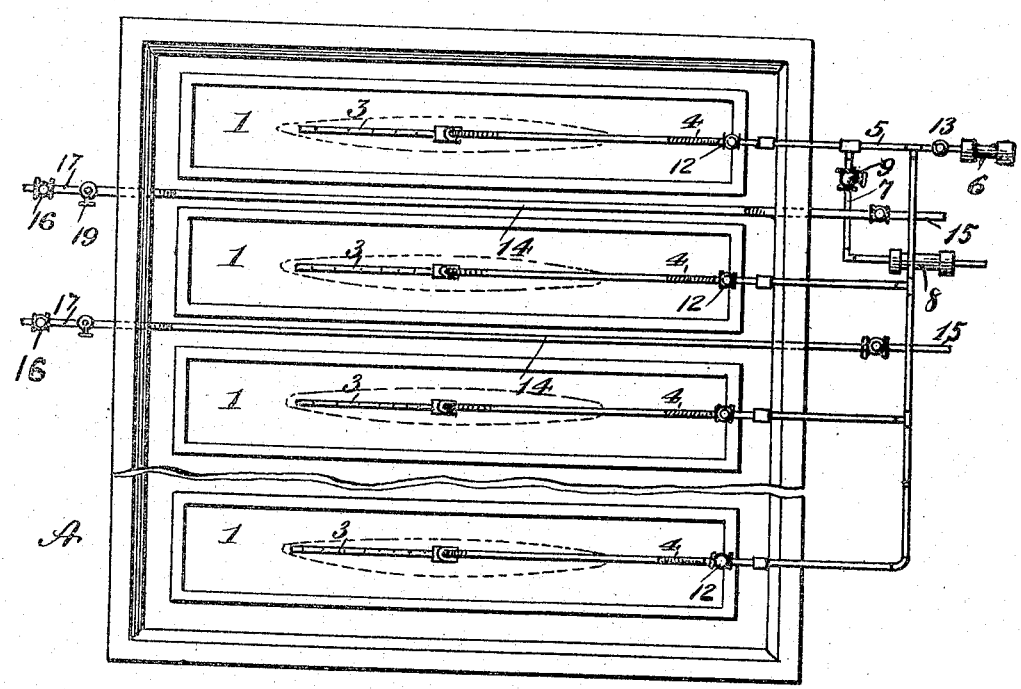

UNITED STATES PATENT OFFICE.

ROBERT J. BERRYMAN, OF ANNAPOLIS, MARYLAND, ASSIGNOR OF ONE-HALF TO MARIANNA BUDD BERRYMAN, OF ANNAPOLIS, MARYLAND.

PROCESS OF MANUFACTURING AND HARVESTING ICE.

936,978. Specification of Letters Patent. Patented Oct. 12, 1909.

Application filed December 31, 1907. Serial No. 408,725.

*To all whom it may concern:*

Be it known that I, ROBERT J. BERRYMAN, a citizen of the United States, residing at Annapolis, in the county of Anne Arundel and State of Maryland, have invented certain new and useful Improvements in Processes of Manufacturing and Harvesting Ice, of which the following is a specification.

My invention relates to an improvement in a process of manufacturing and harvesting ice, and the object is to provide for facilitating the manufacturing and handling of the ice.

With these objects in view my invention consists in certain procedures which will be hereinafter fully described and pointed out in the claims.

In the accompanying drawings Figure 1 is a plan view of a tank with a number of cans therein, and Fig. 2 is a longitudinal vertical section.

A represents an outer tank, and 1, 1 are a number of sheet metal cans therein. The tank is insulated as is customary, and a cover 2 is adapted to be placed over it, as shown in Fig. 2. In the center of each can a pipe 3 is located for discharging air thereinto for agitating the water as the freezing progresses. This pipe 3 is connected by the flexible coupling 4 to a main 5, and an air pump 6 is provided for forcing air through said main out into the can or cans. A branch pipe 7 extends from the main 5 to a suction pump 8, and this branch pipe has a valve 9 therein. An air discharge pipe 10 leads into the tank for agitating the brine contained therein, and this air discharge pipe has a valve 11. The main 5 is provided with valves 12 and 13.

The cold ammonia gas is conducted through the tanks in coils 14 which extend beneath the bottoms and adjacent to the sides and ends of the cans and vents out through the discharge pipe 15. A valve 16 in the inlet pipe 17 of this cold ammonia gas coil 14 controls the passage of cold ammonia gas therethrough. A pipe 18 supplies hot ammonia to the pipe 17 from the high-pressure line, and a valve 19 controls this supply.

In the operation of the process the valves 12 13 and 16 are opened and the valves 9, 11 and 19 are closed. This opens the main to the air pump, and the cold ammonia gas pipe to its supply, so that air is being forced into the water in the cans while the freezing process progresses. When the ice has been formed in the cans and only a cup of impurities remains at the center, the valve 13 is closed shutting off the air pressure, and valve 9 is opened, and in this way the water in the cup is sucked out through the pipe 3 by means of the suction pump and discharged into the sewer, or otherwise disposed of. Now, to thaw the ice loose from the cans the pipe 3 is removed, valves 9, 12 and 16 are closed, and valves 19, 11 and 13 are opened. Valve 19 allows hot ammonia to flow through the coils 14, and this heats the brine in which the cans are submerged. By the opening of valves 11 and 13 air is pumped into the brine through pipe 10, and the whole body of brine is agitated, thus greatly accelerating the heating of the latter, so that the method of harvesting the ice is greatly hastened and facilitated.

From the foregoing it will be observed that the whole process of manufacturing and harvesting the ice is greatly facilitated, and the time required for the completion of the process materially reduced.

More or less slight changes might be resorted to in the process without departing from the spirit and scope of my invention, and hence I do not wish to limit myself to the exact method herein described, but:—

Having fully described my invention, what I claim as new and desire to secure by Letters Patent, is:—

1. The process of manufacturing and harvesting ice which consists in inclosing the water to be frozen in an oblong container, applying a freezing medium to the exterior surfaces of said container, discharging air in a plurality of jets approximately along the longitudinal central plane of the can whereby the inside faces of the plates of ice formed on the side walls of the container are substantially straight and parallel, and subsequently removing the unfrozen water from between the plates of ice formed.

2. The herein described process of manufacturing and harvesting ice, which consists in conveying a freezing medium in pipes passing through a freezing liquid in which the cans are submerged, and subsequently conveying a thawing substance through said pipes and agitating the freezing liquid whereby to facilitate the uniform heating of the latter.

3. The herein-described process of manufacturing ice which consists in submerging the receptacle in which the ice is to be formed in a liquid medium which liquid medium is reduced in temperature for freezing the contents of the receptacle and subsequently heating the same liquid medium for thawing the ice from the receptacle.

4. The herein-described method of manufacturing ice which consists in submerging in a can exposed on all surfaces, a measured or predetermined quantity of water to be frozen, in a liquid medium, conducting a refrigerating medium through said liquid medium in pipes whereby to reduce the temperature of the medium and cause the freezing of the measured quantity of water in the can, and subsequently withdrawing the refrigerating medium from the pipes and substituting a thawing medium and passing it through said pipes, whereby to heat the entire volume of submerging medium uniformly whereby to thaw the ice loose on all surfaces of the can in which it has been formed.

5. The herein-described method of manufacturing ice which consists in submerging a measured quantity of water to be frozen in a liquid medium whereby said water to be frozen is exposed on all surfaces to the influences of the submerging liquid, then conducting a refrigerant through said medium whereby to cause it to freeze the measured quantity of water, and finally withdrawing the refrigerant and introducing a thawing medium in its place whereby to raise the temperature of the submerging liquid to cause it to thaw the ice from the cans.

In testimony whereof I affix my signature in presence of two witnesses.

ROBERT J. BERRYMAN.

Witnesses:
   ROBERT C. EMERY,
   VERNON E. HODGES.